Nov. 12, 1963   B. STERNLICHT   3,110,085
METHOD OF MAKING SELF-LUBRICATING BEARINGS
Original Filed Dec. 11, 1957   2 Sheets-Sheet 1
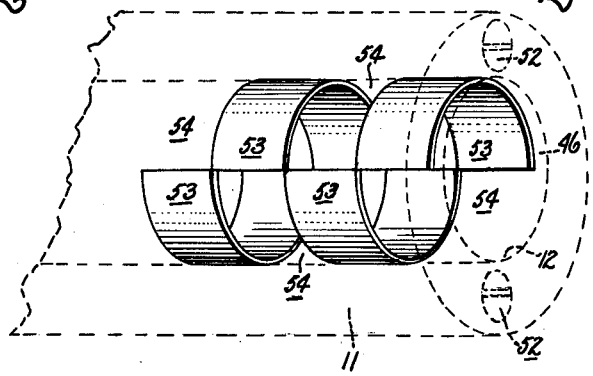
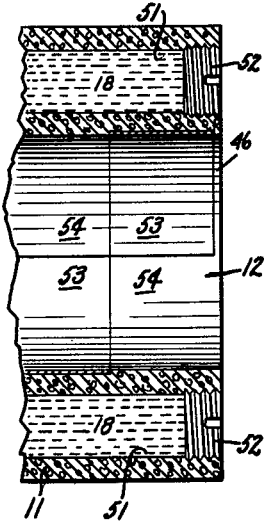
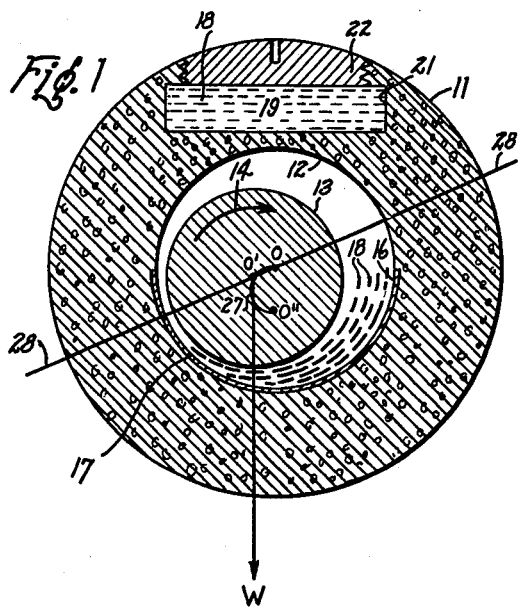
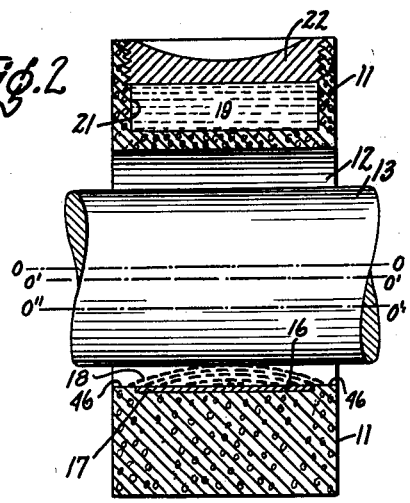
*Inventor:*
*Beno Sternlicht*
*by    ABRAHAM COHEN*
*His Attorney*

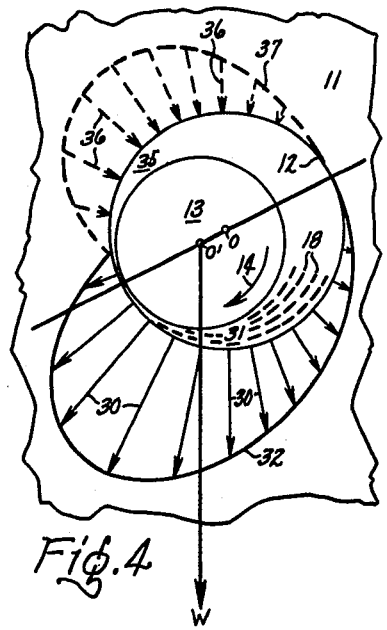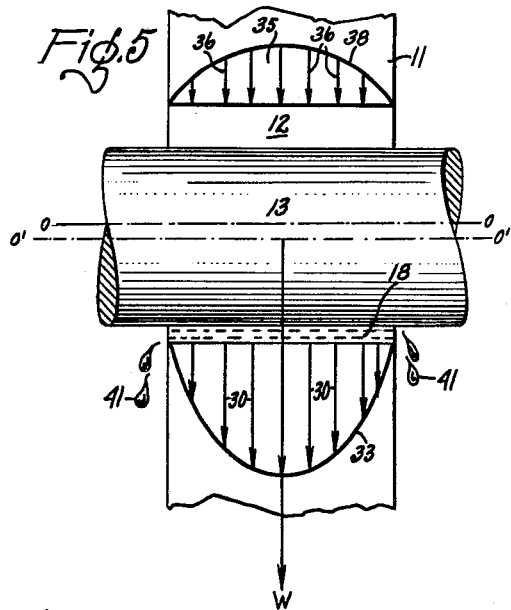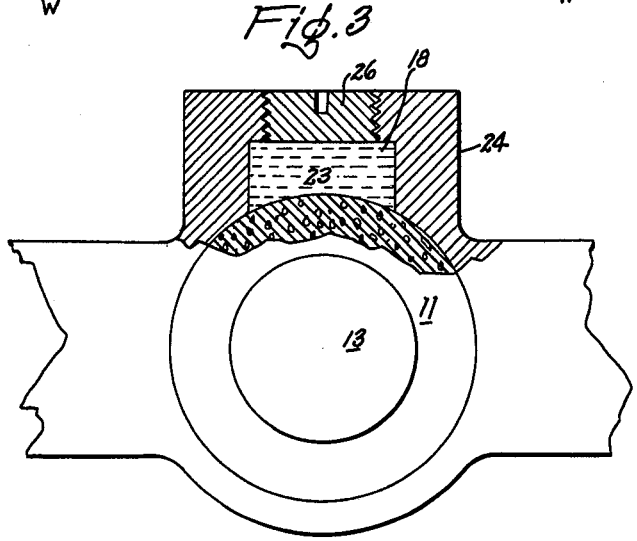

3,110,085
METHOD OF MAKING SELF-LUBRICATING BEARINGS

Beno Sternlicht, Schenectady, N.Y., assignor to General Electric Company, a corporation of New York
Original application Dec. 11, 1957, Ser. No. 702,087, now Patent No. 3,046,068, dated July 24, 1962. Divided and this application Mar. 5, 1962, Ser. No. 179,837
1 Claim. (Cl. 29—149.5)

The present invention relates to bearings and, in particular, to a method of making bearings having improved self-contained lubrication.

This application is a division of application S.N. 702,087, filed December 11, 1957, now U.S. Patent 3,046,068, issued July 24, 1962.

Many types of self-lubricating bearings utilizing various systems such as wick lubrication, oil ring lubrication, disc lubrication, and impregnated porous material lubrication are known in the art. Among the latter type are a number that are complex structures, including porous lubricant dispensing elements inserted through the material of the bearing and into contact with the rotating member. Others are formed completely of a porous lubricant impregnated material, with or without a lubricant reservoir. Under no load or lightly loaded conditions such bearings operate in a substantially satisfactory manner, even though boundary lubrication exists, but under greater load conditions the pressure exerted between the shaft and bearing force the lubricant back into the porous material of the bearing and the results of boundary lubrication become serious.

Boundary lubrication is defined as that which occurs when there is a metal-to-metal contact, with the lubricant present only outside such contact areas.

The results of boundary lubrication are well known in that frictional losses increase and bearing failure eventually occurs. Additionally, it is to be noted that the load carrying capacity of bearings of entirely porous material is considerably lower than that for bearings having a load carrying surface of solid material with hydrodynamic lubrication.

One manner of overcoming the foregoing inherent disadvantages of known types of bearings having self-contained lubrication systems is to provide a bearing having a lubrication impregnated porous material disposed in the load free region and a solid or substantially non-porous material in the load carrying region of the bearing. With such a bearing the load carrying capacity is clearly increased and even under substantially heavy load conditions hydrodynamic lubrication prevails. Hydrodynamic lubrication is defined as that which occurs in the presence of a copious supply of lubricant; that is, there is lubricant present in the loaded region between the bearing and movable member at all times.

An object of my invention is to provide an improved method of making a bearing having a self-contained lubrication system.

A further object of this invention is to provide a method of making an improved bearing having a non-porous surface in the load carrying region and lubricant impregnated porous surface in the load free region.

Briefly stated in accordance with the invention, the bearing is formed of a porous lubricant impregnated material with a non-porous surface disposed in the load carrying region. During operation the load on the shaft results in a positive pressure equal and opposite to the load in the load carrying region of the bearing and a negative pressure in the load free region of the bearing. The negative pressure sucks lubricant from the porous material and the movement of the movable member is such that the lubricant is carried into the space between the bearing and movable member. Thus, as long as sufficient lubrication exists in the porous material hydrodynamic lubrication occurs. Also, means are provided for minimizing lubricant losses due to creepage along the movable member and end leakages.

The novel features which are believed to be characteristic of the invention are set forth with particularity in the appended claims. The invention itself, however, both as to its organization and method of operation, together with further objects and advantages thereof, may best be understood by reference to the following description taken in connection with the accompanying drawing in which:

FIGURE 1 is a lateral cross sectional view of an embodiment of the invention;

FIGURE 2 is an axial cross sectional view of the embodiment of FIGURE 1;

FIGURE 3 is an elevational view, partly in section, of a modification of the embodiment of FIGURE 1;

FIGURE 4 is a diagrammatic view of FIGURE 1 showing hydrodynamic pressures existing during operation;

FIGURE 5 is a diagrammatic view of FIGURE 2, also showing pressures;

FIGURE 6 is a phantom perspective view of another modification of the embodiment of FIGURE 1; and FIGURE 7 is a partial, axial, cross sectional view of the embodiment of FIGURE 6.

Referring now to FIGURE 1 of the drawing, I have shown therein an embodiment of my invention having a generally cylindrical bearing body 11 of a porous or sintered material, such as is well known in the bearing art. The body 11 is provided with a centrally extending opening 12 to receive a movable or rotatable member 13 and the axis of the bearing body is indicated at O in FIGURES 1 and 2 for reference purposes. Under ideal conditions the axis O′ of the movable member 13 is co-linear with the axis O of the body, however, such conditions rarely occur and, because of the force of gravity or other load conditions, the non-operating or rest position of the member is generally in contact with the bearing body so that the axis is at O″.

When the member 13 is rotated in the direction indicated by the arrow 14 within the bearing body 11, as described in the preceding paragraph, boundary lubrication exists at the start and continues during operation. Thus, under substantially heavy load conditions the pressure of the member 13 against the bearing body 11 is such that the area of metal-to-metal contact increases because such pressure forces any lubricant present back into the porous material of the bearing body and failure eventually occurs. The foregoing is factual whether the bearing body is impregnated with a lubricant or lubricant is provided from an external source.

To overcome the deleterious effects of boundary lubrication, I provide a bearing which operates with hydrodynamic lubrication by utilizing the inherently established pressures within the bearing to provide a continuous and copious supply of lubricant where needed. Thus, the load carrying portion 16 of the bearing surface of the opening 12 is rendered non-porous in any suitable manner, such as by the insertion of a semi-circular plate 17, or otherwise sealing the pores of such portion. The method of sealing the pores of the desired portions 16 of the bearing body 11 will be described in greater detail hereinafter.

Lubricant 18, as shown by dash lines on the drawing, is provided within the bearing opening 12 by impregnating the porous material of the body 11 with such lubricant, and further to increase the life of the bearing a lubricant containing reservoir 19 may be formed in the body adjacent to the load free portion as, for example, the chamber 21 having a threaded access screw 22 associated therewith. Also, it is to be noted that alternative systems for providing additional lubricant to the bearing may be established and one such system includes, as shown in FIGURE 3, a lubricant containing reservoir 23 that may be formed in the bearing housing 24 with an access screw 26. In the latter system the lubricant 18 of the reservoir 23 seeps into the porous material of the bearing body 11 to replace losses by use.

Now, when the member 13 is rotated in the bearing body 11 having a non-porous load carrying portion 16 and rotation is in the direction of the arrow 14, the member rotates with the axis at O' of FIGURES 1 and 2. The exact axis of rotation is established by the presence of a suitable quantity of lubricant, the amount of weight or load W on the member, and the speed of rotation of the member. With other quantities remaining constant, a new position of the axis O' is established for each value of load W and will lie along the locus line 27 of FIGURE 1. The distance O—O' of FIGURE 1 denotes the eccentricity between the bearing body 11 and the rotatable member 13 while the attitude angle is indicated by the angle between direction of the load W and a line 28, which includes both axis centers O and O'.

With such operation positive pressures, as indicated by the arrows 30 of FIGURES 4 and 5, are developed in the converging load carrying region 31 and the summation of such pressures is equal and opposite to the load W. The line 32 of FIGURE 4 indicates the envelope of the positive pressures in the transverse direction and the line 33 of FIGURE 5 indicates the envelope of the positive pressures in the longitudinal direction.

It has been determined that negative pressures are developed in the diverging load free region 35 as indicated by arrows 36 of FIGURES 4 and 5 and the envelopes of such negative pressures in the transverse and longitudinal directions are indicated by lines 37 and 38, respectively.

The positive pressures provide stability to the system and the negative pressures suck lubricant 18 from the porous material into the opening 12. Thus, as the member 13 rotates in the opening 12 of the bearing body 11, the negative pressures provide a continual supply of lubricant 18 within the opening and the rotation of the member pulls the lubricant into the region between the bearing body and the rotating member where needed. Hydrodynamic lubrication is achieved and continues until the supply of lubrication 18 is exhausted from the porous material and reservoir, if provided, by creepage along the member 13 or by spillage as indicated by drops 41 in FIGURE 5.

To minimize losses from creepage and end leakage the non-porous portion 16 is extended to within a short distance of either longitudinal end of the bearing body 11 to leave a strip 46 (see FIGURE 2) of porous material as a return path for the lubricant 18. The action at such strips 46 is the same as that previously set forth for bearings having no non-porous surfaces; that is, the pressures developed force the lubricant back into the porous material, however, metal-to-metal contact is prevented by the hydrodynamic lubrication in the remaining portion 17 of the bearing. Thus, the film of lubricant 18 assumes the contours shown by dash lines in FIGURE 2.

The foregoing embodiment of the invention has been described for the condition where there is a load in one direction only. Another embodiment is illustrated in FIGURES 6 and 7 for other types of loads such as rotating loads or variable loads resulting from unbalanced conditions in the rotating member or the drive (not shown). Referring to such figures, there is again shown a bearing body 11 of porous material, similar to that of FIGURES 1 and 2, and having an axially extending opening 12 for receiving a rotatable member (not shown).

An annular reservoir 51 for containing lubricant 18 is provided within the body 11 with access screws 52. Semi-circular portions 53 of the non-porous surface are alternated with similarly dimensioned semi-circular portions 54 of the porous surface along the upper longitudinally extending surface of the opening 12. A similar array of semi-circular portions 53 and 54 is provided along the lower longitudinally extending surface of opening 12 with each non-porous portion 53 opposing a porous portion 54 of the upper array and each porous portion opposing a non-porous portion. Thus, for all load conditions a substantial area of non-porous surface 53 exists in the load carrying region, as well as a substantial area of impregnated porous surface 54 in the load free region of the bearing, and hydrodynamic lubrication occurs in a manner similar to that described for the embodiment of FIGURE 1. While the illustration of the foregoing embodiment shows four non-porous portions 53 (see FIGURE 6) it is not intended that such array be limiting in any manner as it is clearly apparent that any number may be utilized depending upon the size of bearing and type and amount of weight to be countered.

The preferred method of making the bearings, as described in the foregoing, is to machine bearing blocks of a suitable porous material to proper size and provide a bearing body 11. During the machining operation substantially all of the pores on the surfaces become closed because of the pressures exerted by the cutting tool and the heat generated. After the machining operation areas of the surface to remain non-porous are masked, or otherwise protectively coated, and the resultant bearing inserted in an acid bath so that the pores of the non-protected surface are opened. Such latter step may also be accomplished by selective insertion into the acid bath; that is, only those portions that it is desired to render porous are inserted into the acid solution and no protective coating is required. Finally, the bearing is immersed in a lubricant which is then heated to impregnate the porous material and the bearing emerges ready for use.

A bearing, made in accordance with the foregoing, having an inside diameter of one-half inch and a length of one-half inch, has been continuously operated for more than sixty days with no indication of boundary lubrication. During such operation the bearing journaled a shaft rotating at 1800 revolutions per minute under a load of 50 pounds per square inch. The bearing size, shaft speed, and load conditions are merely illustrative and not intended to be limiting in any manner.

While particular embodiments of this invention have been shown it will, of course, be understood that it is not limited thereto since many modifications both in the arrangement and in the instrumentalities employed may be made. It is contemplated by the appended claim to cover any such modifications as fall within the true spirit and scope of this invention.

What I claim as new and desire to secure by Letters Patent of the United States is:

In a method of making bearings having a self-contained lubrication system, the steps comprising forming a block of porous bearing material, machining the surfaces of said block to size whereby pores of said surfaces become closed, masking areas of the machined block with an acid-resistant material, treating the remaining surfaces with an acid solution to open the pores of such surfaces, immersing the resultant block in a lubricant, and heating the lubricant to impregnate the porous material.

References Cited in the file of this patent

UNITED STATES PATENTS

| | | |
|---|---|---|
| 2,478,856 | Beaver | Aug. 9, 1949 |
| 2,663,928 | Wheeler | Dec. 29, 1953 |